N. B. RANDALL.
RECOIL OPERATED GUN.
APPLICATION FILED FEB. 14, 1912.
1,056,056.
Patented Mar. 18, 1913.
6 SHEETS—SHEET 4.
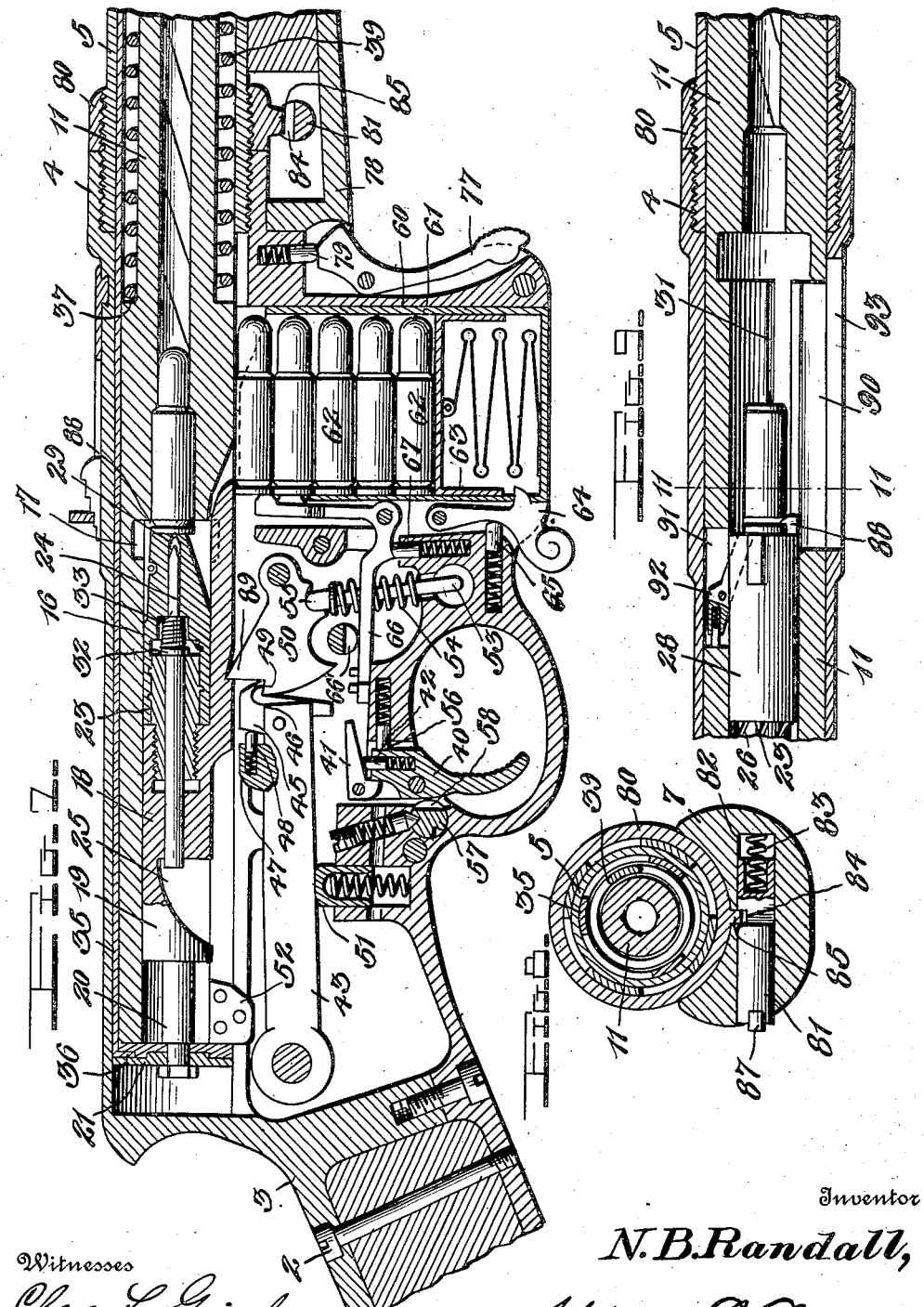
Witnesses
Chas. L. Griesbauer.
G. B. Norton.
Inventor
N. B. Randall,
By Watson E. Coleman.
Attorney

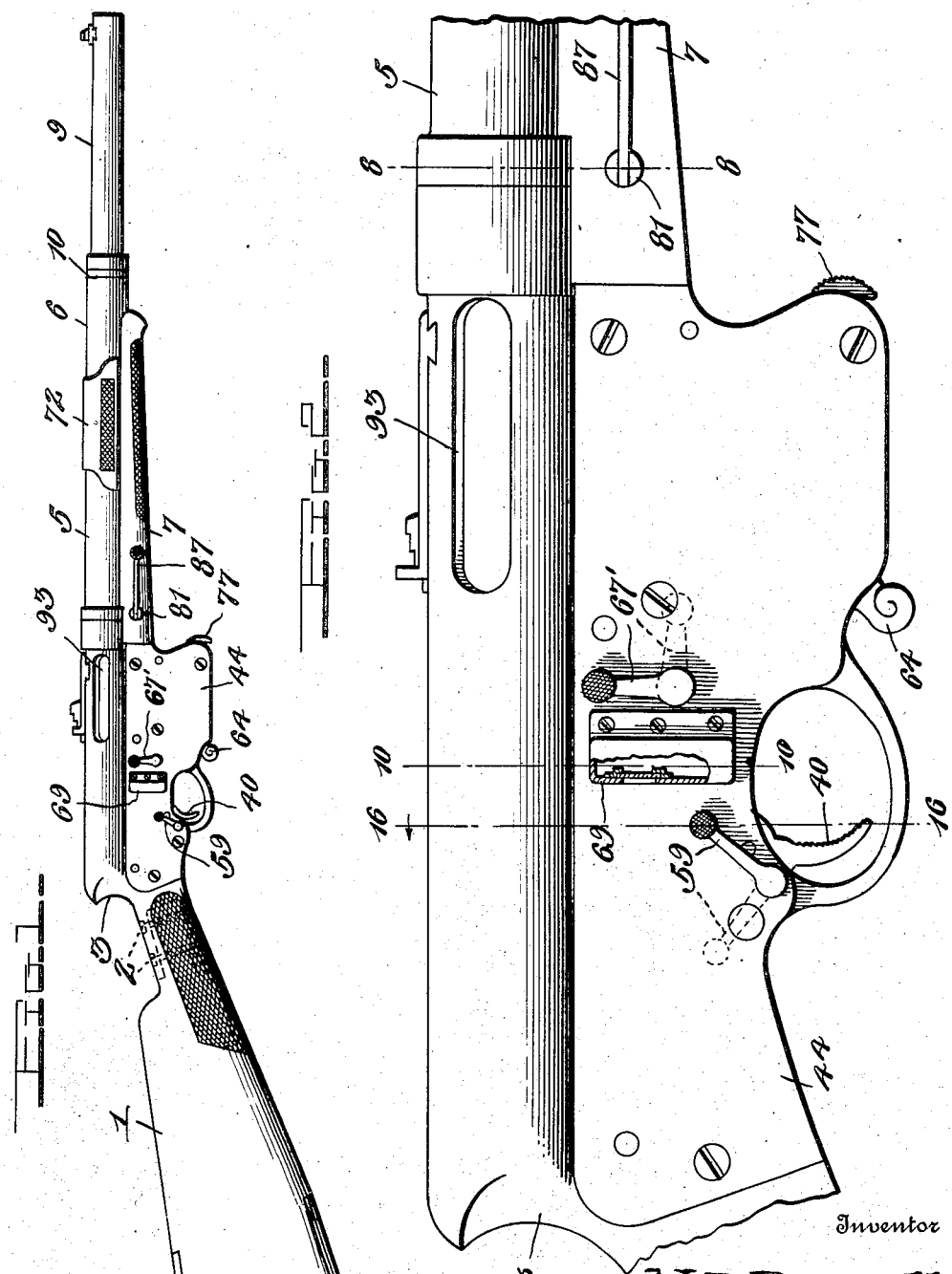

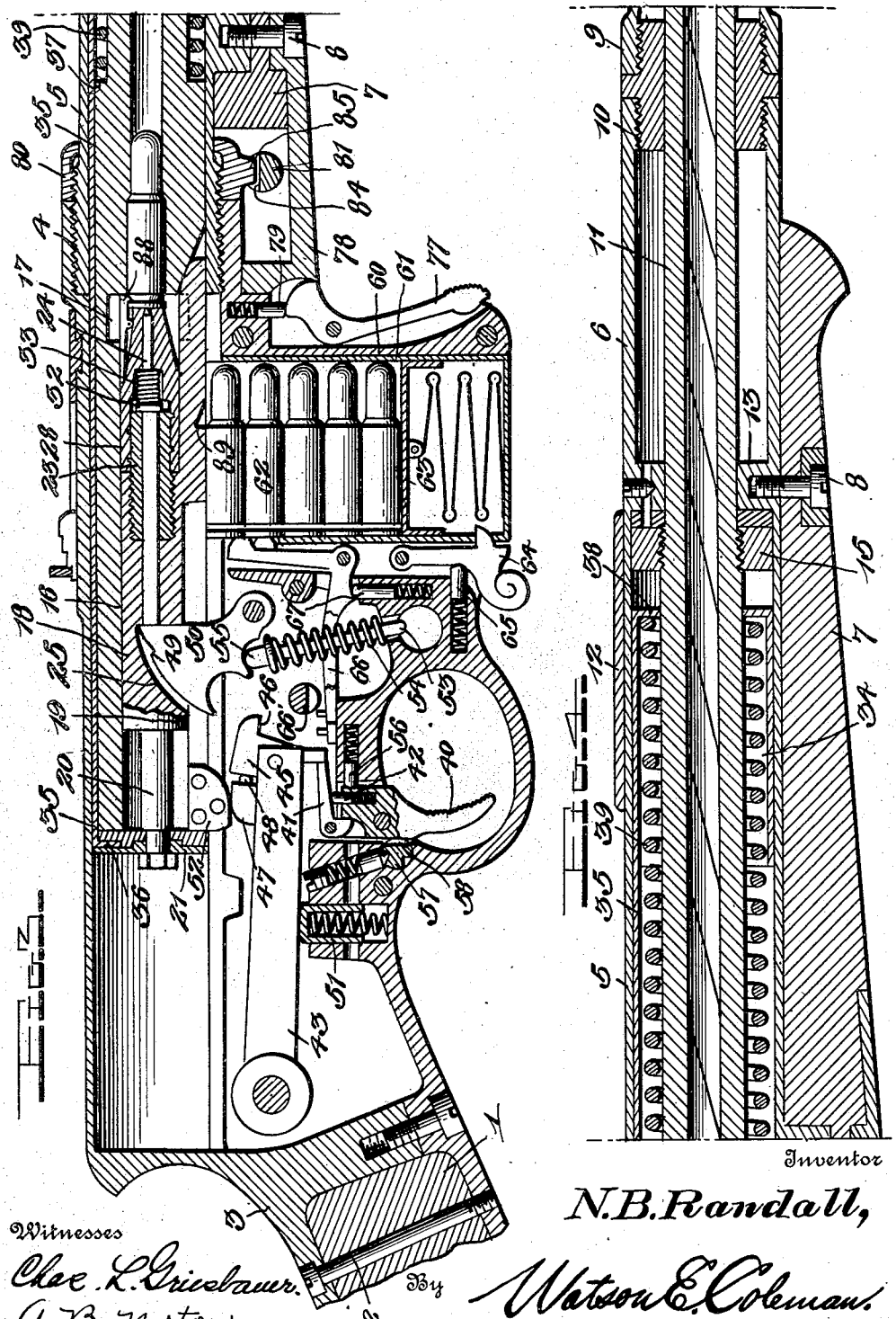

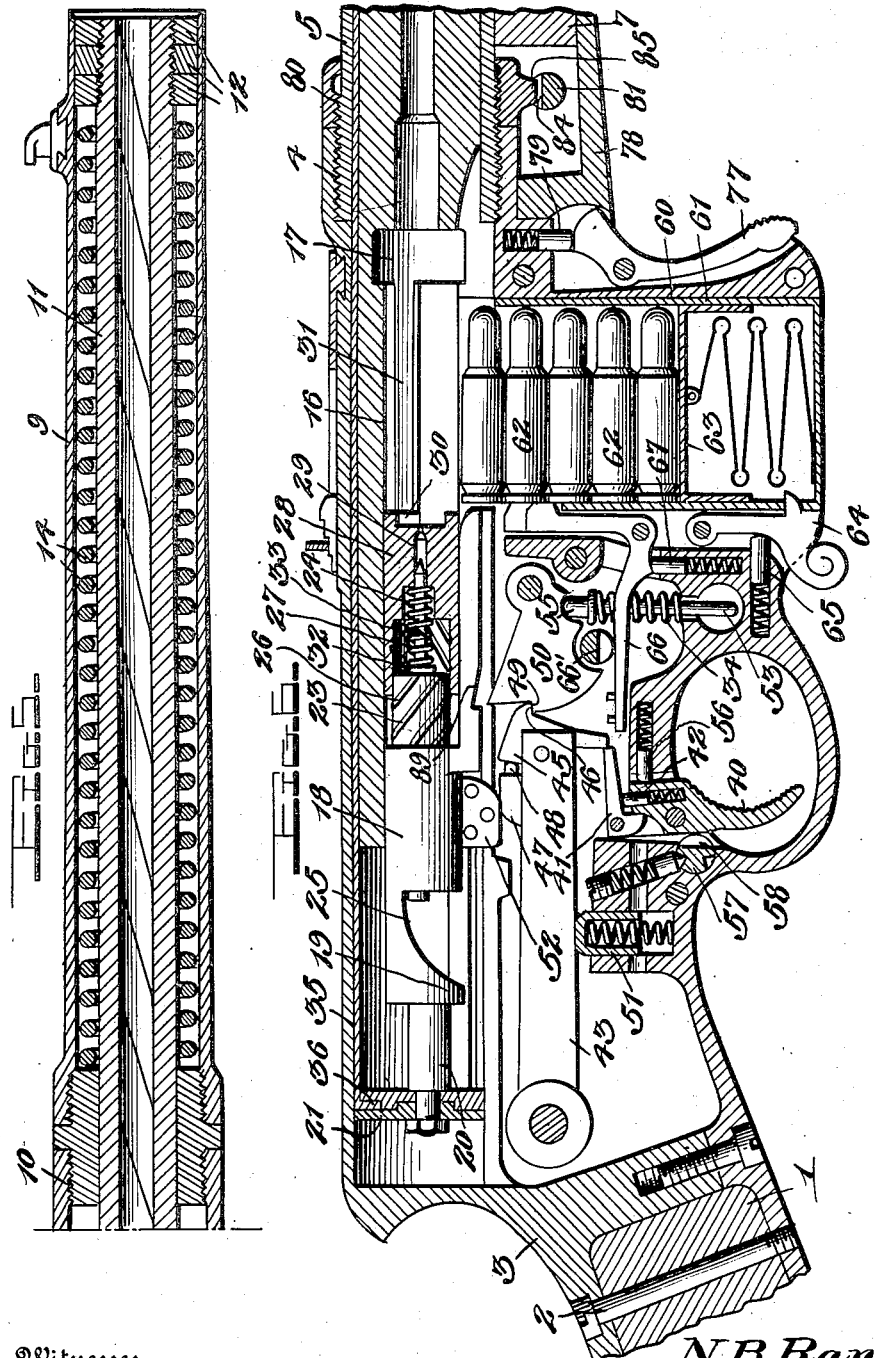

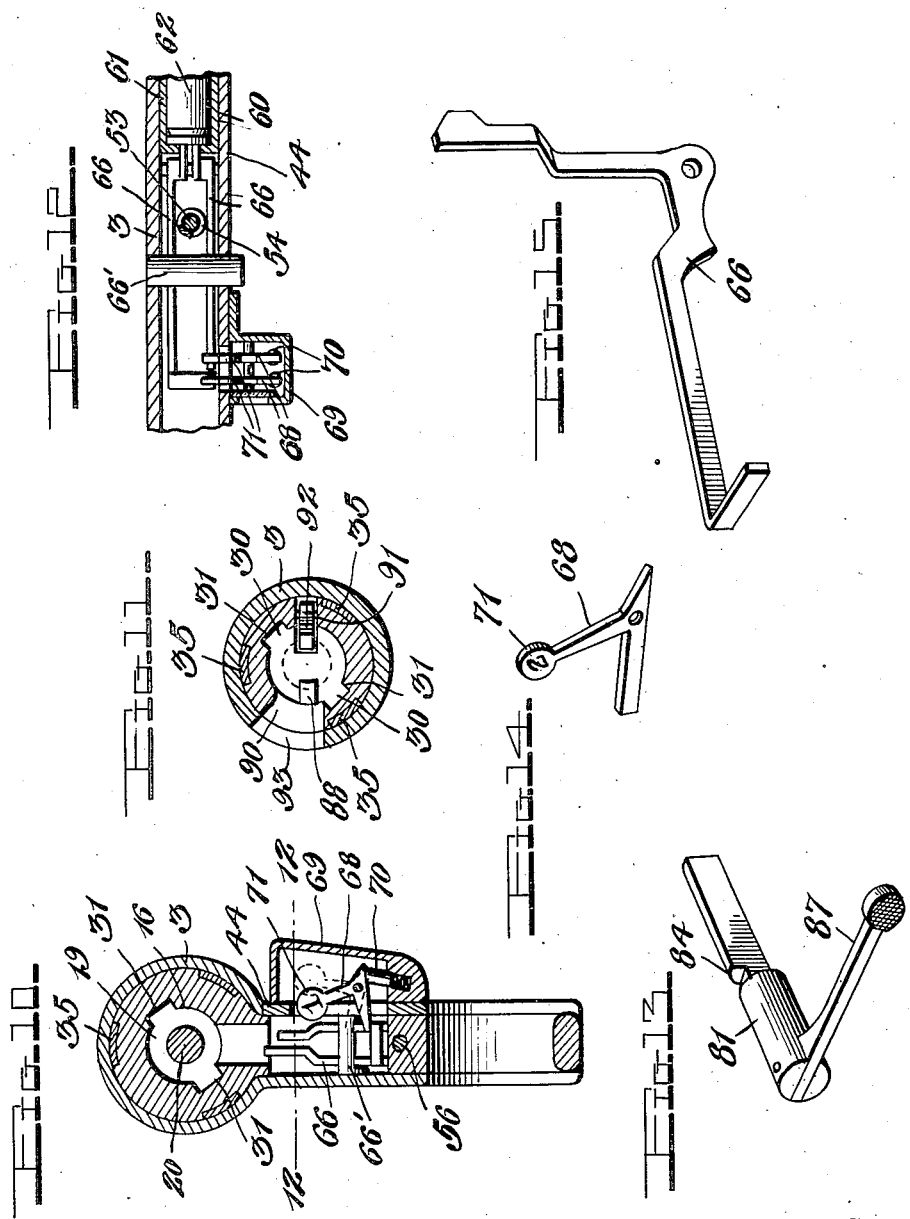

N. B. RANDALL.
RECOIL OPERATED GUN.
APPLICATION FILED FEB. 14, 1912.
1,056,056.
Patented Mar. 18, 1913.
6 SHEETS—SHEET 6.
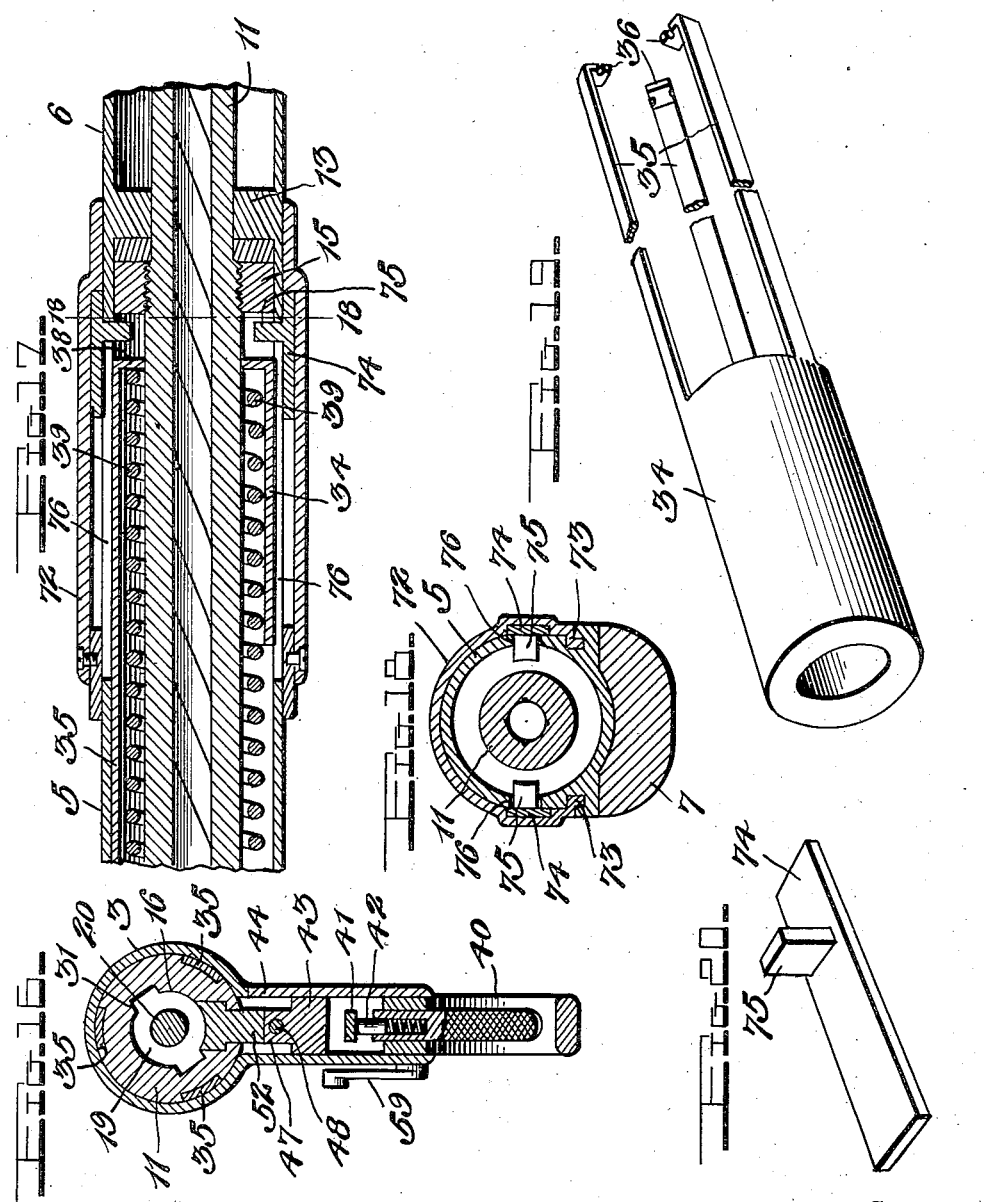
Witnesses
Chas. L. Griesbauer.
G. B. Norton.
Inventor
N. B. Randall,
By Watson E. Coleman,
Attorney

UNITED STATES PATENT OFFICE.

NORMAN B. RANDALL, OF BOSTON, MASSACHUSETTS.

RECOIL-OPERATED GUN.

1,056,056.  Specification of Letters Patent.  Patented Mar. 18, 1913.

Application filed February 14, 1912. Serial No. 677,544.

*To all whom it may concern:*

Be it known that I, NORMAN B. RANDALL, a citizen of the United States, residing at Boston, in the county of Suffolk and State of Massachusetts, have invented certain new and useful Improvements in Recoil-Operated Guns, of which the following is a specification, reference being had to the accompanying drawings.

This invention relates to new and useful improvements in fire arms and more particularly to an automatic breech-loading fire arm and my object is to provide a device of this character in which the automatic loading is accomplished by means of an improved recoil operating mechanism.

A further object of the invention resides in providing a device having a movable barrel to which is attached a breech block, said barrel and breech block being adapted for movement together by recoil and a still further object resides in providing means to retain the breech block in its retracted position while the barrel is allowed to resume its initial position, whereby the exploded shells may be ejected.

A further object of the invention resides in the provision of a retractor spring in connection with the barrel for returning the breech block to its initial position after the spent shell has been ejected therefrom and a still further object resides in the provision of a hand operated means for retracting the breech block independently of the barrel.

Another object of the invention resides in the provision of a hammer which performs a double function in being used, as usual, to strike the firing pin and in also being adapted for use as a locking pawl to retain the breech block in its retracted position to permit the exploded shells to be ejected and still another object resides in providing a device which is simple and durable in construction, comparatively inexpensive to manufacture and one which will be efficient in operation.

With these and numerous other objects in view, my invention consists in the novel features of construction, combination and arrangement of parts as will be hereinafter referred to and more particularly pointed out in the specification and claims.

In the accompanying drawings forming a part of this application, Figure 1 is a side elevation of the device entirely set up for operation; Fig. 2 is an enlarged fragmentary side elevation of the same; Fig. 3 is a fragmentary vertical section through the gun showing the mechanism in normal position; Fig. 4 is a similar view disclosing the portion of the gun forming a continuation of the portion shown in Fig. 3; Fig. 5 is a similar view showing a continuation of Fig. 4; Fig. 6 is a fragmentary vertical section through the gun showing the position of the parts of the device as the barrel is returning to its initial position, the hammer being shown in a position just disengaged from the breech block;. Fig. 7 is a similar view through the device showing the barrel and breech block in their retracted positions, the hammer being shown engaged with the breech block; Fig. 8 is a transverse section through the gun as seen on the line 8—8 of Fig. 2; Fig. 9 is a fragmentary horizontal section through the device showing the operation of the ejector pawl; Fig. 10 is a vertical transverse section as seen on line 10—10 of Fig. 2; Fig. 11 is a similar view as seen on line 11—11, Fig. 9; Fig. 12 is a horizontal section as seen on line 12—12 of Fig. 10; Fig. 13 is a perspective view of the take-down locking pin; Fig. 14 is a similar view of one of the levers used in the magazine indicating mechanism; Fig. 15 is a similar view of one of the other levers used in the magazine indicating device; Fig. 16 is a vertical section through the gun as seen on line 16—16 of Fig. 2; Fig. 17 is a fragmentary horizontal section through the gun showing the construction and operation of the retractor grip and its adjunctive parts; Fig. 18 is a vertical transverse section as seen on line 18—18 of Fig. 17; Fig. 19 is a perspective view of the retractor sleeve; and Fig. 20 is a similar view of one of the sliding plates carried by the retractor grip.

In describing my invention, I shall refer to the drawings in which similar reference characters designate corresponding parts throughout the several views and in which—

1 indicates a stock, such as is used in shoulder guns of the present day, to which is secured, by means of the bolts 2, a metallic receiving casing or frame 3, said frame or receiver having an upper tubular portion which has the outer end thereof internally threaded as shown at 4, to receive in engagement therewith the threaded end of the inner section 5 of a sectional barrel casing 6. This section 5 of the barrel casing is braced in the usual manner by means of the fore-arm 7 which is secured to said section and a portion of the frame 3 by means of the screws 8 and the outer section 9 of said barrel casing is engaged with the outer end of the inner section 5 thereof by means of an internally arranged union 10.

Disposed through the barrel casing 6 is a barrel 11, the extreme outer end of which is externally threaded to receive the nuts 12 which tend to guide said barrel in the casing 6, said barrel being also guided within said casing by means of the union 10 and an internal annular flange 13 arranged in the section 5 of said casing. This guiding mechanism for the barrel is necessary in view of the movement of the latter upon recoil and in order to retain the barrel normally in its forward position, as shown in Fig. 3, a retractor spring 14 is provided which is coiled about the barrel between the one peripheral edge of the union 10 and the inner of the series of nuts 12 at the end of said barrel. The barrel 11 has also disposed in threaded engagement therewith, about midway of its ends, a nut 15 which is adapted to abut the annular flange 13 of the barrel casing 6 to limit the forward movement of said barrel when acted upon by the retractor spring 14 and I have also provided means to prevent undue shock and jar as the nut 15 abuts the flange 13 upon the return of the barrel to its initial position. This means consists in providing an air vent 15' in the barrel casing at the point wherein said flange 13 is provided and as the barrel 11 is retracted air will be drawn in the space between said barrel and casing. It is obvious therefore, that the return of the barrel to its initial position will be impeded somewhat and thus permit the barrel to return gently to its position.

The bore of the barrel 11 is enlarged at the rear end to form a socket or the like 16 adapted to receive a breech block 18 therein and said socket has a recess 17 formed at the one end thereof which communicates with the shell receiving chamber 17'. This breech block comprises a breech or tractor bolt 19, the rear portion of which is reduced as shown at 20 and engaged with a pair of disks or plates 21 which are circular and slidably arranged in the tubular portion of the frame 3. The opposite end of the tractor or breech bolt 19 is provided with a threaded socket 22 with which is engaged the threaded end of the breech block locking spiral 23 and slidably extending through the spiral and the bolt 19 is the firing pin 24, the butt end of said latter pin being projected into a cavity or notch 25 adapted to receive therein a hammer, not yet described.

The member 23 is described as a spiral in view of the spirally arranged grooves or slots 26 therein, said slots or grooves being adapted to receive therein the tongues or the like 27 formed on the inner periphery of a breech block head 28. This head 28 has the bore thereof reduced adjacent the forward portion thereof as shown at 29 to receive snugly therethrough and guide therein the effective end of the firing pin 24 and the outer periphery of the head 28 is provided with lugs 30 which are adapted to enter grooves 31 which are disposed on diametrically opposite sides of the socket 16 to guide the head in a longitudinal movement therein.

The firing pin 24 is provided with a collar 32 which limits the rearward movement of the same as it is adapted to abut the outer end of the spiral 23 and encircling this pin 24 just beyond the collar 32 is a coil spring 33 one end of which spring is adapted to contact with said collar while the opposite end thereof is adapted to engage the shoulder formed on the inner periphery of the head 28 by the reduction of the bore thereof and it will be appreciated from this construction that when said head 28 is in such a position that one end of the spring abuts the shoulder therewithin the tendency of said spring will be to force said pin 24 rearwardly as shown particularly in Fig. 3. The pin, under these conditions, is in its normal and ineffective position.

As stated above, the breech block 18 is slidably arranged in the rear end portion of the barrel 11 but I have provided such means as will normally dispose this breech block in its closed position, that is, in a position as shown in Fig. 3 wherein the plates or disks 21 at the rear end of the breech block will abut the rear end of the barrel 11 and to this end a breech block rectractor sleeve 34 is provided which is slidably arranged within the section 5 of the barrel casing 6, said sleeve being tubular for a portion of its length and provided with a plurality of longitudinally disposed arms 35. These arms 35 of the sleeve fit closely between the inner periphery of the tubular portion of the frame 3 and the outer periphery of the rear end of said barrel 11 and the extreme rear or free ends of the arms 35 are bent inwardly as shown at 36 to be held between the pair of plates or disks 21 which are secured to the rear end of the tractor or breech bolt 19. The barrel 11 is increased in diameter adjacent its rear end in order to provide for the breech loading mechanism, as is usual, said enlargement of the diameter providing a shoulder 37 on the outer periphery of the barrel. The end of the tubular sleeve portion 34 opposed to the ends 36 is bent inwardly to form an annular flange or the like 38 and encircling the barrel 11 between its flange 38 and the shoulder or abutment 37 is an additional coil spring 39 which may be termed, for convenience, a breech block retractor spring.

Pivotally carried in the lower portion of the frame 3 is a trigger 40 which has pivotally mounted thereon a substantially L shaped trigger dog 41, said dog being adapted to be held in proper position so that the main portion of the same is disposed in a horizontal position by means of a spring forced pin or stud 42 carried on the upper portion of said trigger 40. A lever 43 has one end of the same pivotally carried within the frame 3 below the tubular portion thereof, the pivot point of the same being disposed through the sides of a casing or covering 44 which entirely covers the lower portion of the frame 3 and the various operating parts carried therein, and the free end of said lever 43 has pivotally mounted therein a sear 45 the upper portion of which projects somewhat beyond the end of the lever to form a hook or the like 46 while the lower portion thereof depends below said lever and is adapted to be engaged by the free end of the trigger dog 41. The lever 43 is also provided on its upper face adjacent the free end thereof with an integral housing or the like 47 which forms somewhat of a continuation of the sear 45 when the latter is disposed thereagainst but a spring forced pin 48 projects from the one end of said housing 47 to normally force said sear away from the same and in a position as shown in Figs. 3 and 7. The action of this pin 48 disposes the lower end of the sear 45 in position to be engaged by the trigger dog 41, at the same time, disposing the hook portion 46 at the upper end thereof downwardly to engage a notch 49 in the outer edge of a hammer 50, said hammer being pivoted within the frame 3 forward of the sear 45. This lever 43 is adapted to be forced normally upward by means of an additional spring forced pin or lug 51, which is carried in the lower portion of the frame 3 immediately therebelow but a cam or what may be termed a retractor cam 52 carried on the rear end of the barrel 11 is adapted to contact with the housing portion 47 of the lever to force the latter downwardly and said hammer 50 is adapted to be normally forced upward by means of a sliding pin 53, which is also carried in the frame 3 and forced upward by means of a coil spring 54 encircling the same. This coil spring contacts with the solid portion of the frame and with a head 55 at the one end of said pin and said head is adapted to contact with a portion of the hammer 50 so that the hammer is normally adapted to be forced upwardly into the cavity 25 of the tractor bolt 19, it being also obvious that this upward movement of the hammer is controlled by means of the sear 45 which is adapted to engage the notch 49 on said hammer.

The upper portion of the trigger 40 beyond the pivotal point is adapted to be engaged by a spring forced pin 56 which projects from the solid portion of the frame above the trigger guard to normally dispose the lower end of said trigger forwardly so that the same must be drawn rearwardly to overcome the tension of the spring forced pin in order to fire the gun and I have provided means to prevent the accidental discharge of the gun by any casual movement of the trigger. This means consists in providing a shaft or the like 57 which extends transversely through the frame portion 3 immediately in the rear of the trigger 40, said shaft being provided with a flattened portion 58 intermediate of its ends and one end of the shaft has mounted thereon an operating lever 59 whereby said shaft may be readily rotated when desired. When this lever 59 is moved forwardly as shown in Fig. 1, the flattened portion of the shaft 57 is disposed forwardly to allow the trigger to be withdrawn therein but when the lever 59 is disposed rearwardly opposed to the position shown in Fig. 1, the flattened portion will be disposed rearwardly, thereby preventing the withdrawal or retraction of said trigger 40.

The frame 3, just forward of the portion in which the hammer 50 is located, is provided with a magazine chamber or the like 60 which is adapted to receive therein the magazine 61 of the usual type containing a plurality of shells 62. As stated, this magazine is of the usual type wherein a spring follower 63 is provided to force the shells upwardly into position to enter the barrel and in order to lock the magazine in position in the cavity 60, a catch or pawl 64 is provided which is pivotally carried on the frame 3 and adapted to be operated by the gunner. This catch or pawl is adapted to extend through an opening in the magazine to retain it in position as shown in Fig. 3 and a spring forced pin 65 carried in the solid portion of the frame 3 immediately forward of the trigger guard, normally retains said catch 66 in its effective position.

I have also provided a mechanism for indicating the number of shells remaining in the magazine after a portion have been fired, which mechanism comprises a plurality of levers 66, I having shown two in the drawings, which levers are substantially L shaped and pivoted at the intersections of the arms thereof within the frame immediately in the rear of the magazine casing. These levers are so arranged that normally a portion of the same will be disposed horizontally and a portion thereof vertically, said vertical portions being provided with lugs or the like on the free ends thereof, which are adapted to project through respective slots or openings in the magazine to contact with the heads of the shells therein and spring forced pins 67 carried in the frame 3 are normally in contact with the other arms of each of said levers, forcing the same upwardly, thereby adapting the lugs on the free ends of the vertical portions of the levers to project through said slots in the magazine. As shown, the pair of levers which I have provided are adapted to contact, respectively, with the upper two shells of the magazine and an additional pair of levers 68 are also provided which are pivotally mounted in a casing 69 on an axis at right angles to the pivoted axis of the levers 66. This casing 69 represents a housing or the like secured to the one face of the covering 44 and said levers 68 are also of the L shaped type, the horizontal portions thereof respectively resting on the horizontal portions of the levers 66 whereby when said latter levers are swung on their pivots, the levers 68 will also be swung. The levers 68 are normally held in a position in contact with the levers 66 by means of spring forced pins 70 carried within the housing 69 so that it will require a movement of the levers 66 on their pivots in order to swing the levers 68. These levers 68 have the free ends of the vertical portions thereof provided with dials or the like 71 upon which may be printed any indications representing the number of shells remaining in the magazine and the rear wall of the housing 69 may be formed of glass or other transparent material whereby the operator of the device may readily observe the dials as the same are brought into position. As the shells, with which the lugs on the vertical portions of the levers 66 contact, are removed from the magazine, said levers will be swung on their pivots so that the free ends of the horizontal portions thereof will be turned upwardly and when the lever which contacts with the last of the shells in the magazine is in this position, the free or raised end of the same interferes with the operation of the sear 45 so that the same cannot be moved to release the hammer 50 from its engagement therewith. This mechanism therefore acts as a reserve for the last shell in the magazine but a means is also provided for the disposing of one lever 66 out of the position which interferes with the sear and to this end a pin 66' is extended transversely of the frame immediately above the horizontal portions of said levers. This pin or shaft 66' has a flat portion thereon which when disposed downwardly facing the horizontal portions of the levers 66, will permit of the levers readily operating to accomplish the desired result of reserving the last cartridge but when turned by means of a hand lever 67', the periphery of the pin will contact with said horizontal portions to force the same downwardly and out of the path of the sear 45. This hand lever 67' is mounted on one end of the pin 66', the same being disclosed in Fig. 1 on the outer face of the covering 44 whereby the gunner may readily operate the same at will.

As previously described, the breech block is adapted to be retained in its closed position in the end of the barrel 11 by the breech block retractor spring 39 but I have also provided means whereby the breech block may be retracted manually irrespective of the barrel. To this end I provide a retractor grip 72 which is slidably arranged in grooves 73 on the section 5 of the barrel casing 6, said grip being provided at diametrically opposite points on the inner face thereof with a pair of sliding plates 74 and each of these plates 74 is provided with an inwardly extending lug or the like 75 which lugs project through longitudinal slots 76 in the barrel casing 6. These slots 76, of course, are arranged at diametrically opposite points thereon, on the sides of the barrel casing and these lugs 75 are disposed just forward of the extreme outer end of the retractor sleeve 34 whereby it will be appreciated that as the grip 72 is drawn rearwardly on the casing 6, the sleeve 34 will be forced rearwardly to correspondingly retract the breech block 18 from the end of the barrel 11. This withdrawing of the breech block may be done for the purpose of loading the device and it will be appreciated that as soon as pressure is released from the grip 72, the spring 39 will retract said breech block to its normal position and corresponding return the grip to its normal position. It will be seen however, upon the withdrawing of the barrel 11 to a rearward position as shown in Fig. 7, the retractor grip will not be effected, the barrel only carrying therewith the sliding plates 74.

Pivotally carried on the frame 3 immediately forward of the chamber within which the magazine is carried is a pivoted lever 77, the one end of which is adapted for manual engagement while the opposite end is adapted to bind frictionally against a bracing piece 78 which is in turn secured to the wooden forearm 7. When in such frictional contact with this plate or piece 78, the lever is in its effective position and retains the barrel casing and the various other adjunctive parts in their set up position and in order to retain this lever in its effective position, a spring forced pin 79 is provided in the frame 3, the same forcing downwardly on the effective end of said lever to retain the same in the positioned mentioned. In order to release the lever, forward pressure upon the operating end of the same is necessary.

It has also been stated, in describing the barrel casing 6 that the inner section 5 thereof is threaded into engagement with the threaded portion 4 of the tubular portion of the frame 3 and I have provided a lock nut 80 for this engagement of the barrel casing with the frame. This lock nut engages the threaded portion of the barrel casing 6 against the outer end of the tubular portion of the frame 3. I have also provided means for the retaining of this lock nut in position, which comprises a pin or shaft 81 which extends in a transverse socket 82 in the frame. A spring 83 in said socket is adapted to force the pin or shaft outwardly but a slot 84 in said pin is adapted to receive in engagement therewith a lug 85 on the lock nut which will retain the pin or shaft 81 within the socket. The tension of the spring 83 will force the pin 81 tightly against the lug 85 thereby retaining the lock nut 80 in position and in order to allow this pin 81 to be inserted in the socket 82 after the lock nut has been positioned, said pin is flattened on one side thereof as shown at 86. A hand lever 87 carried on one end of said pin or shaft 81 permits the pin to be readily operated by the gunner when it is desired to take down the various parts of the device.

It must be here stated that the breech block head 28 is provided with an extractor pawl 88 which is spring held and adapted to engage, as usual, the heads of the shells which are forced in the shell receiving socket 17' and it will be appreciated that as the barrel with the breech block therein is forced rearwardly after the firing of one of the shells, the exploded shell will be withdrawn with the breech block. As the barrel and the parts carried thereby are forced rearwardly the hammer 50 will be forced downwardly to allow the sear 45 to be engaged therewith, at the same time engaging a notch or the like 89 in the breech block, as shown particularly in Fig. 7. The hammer in this instance, forms a pawl to retain the breech block while the retractor spring 14 will swiftly retract the barrel to its initial position and I have provided means for the ejection of the exploded shell which will be operable upon the retracting of this barrel to its initial position. The barrel 11 is provided on the one side thereof with an elongated opening 90 and the wall of said barrel at a point diametrically opposite that containing the opening 90 is provided with a slot 91 within which is pivotally mounted a spring held pawl 92. As the barrel is swiftly returning to its initial position after the force of the recoil is spent, the effective end of the pawl 92 will project beyond the slot 91 as the same nears the end of the breech block head 28 and will engage the head of the exploded shell and trip the same over the extractor pawl 88. The force with which the ejector pawl 92 strikes the shell will be sufficient to drive the same through the opening 90 and, as at this point said opening 90 will aline with a similar opening 93 in the side of the frame 3, said shell will be completely ejected from the gun. It will be appreciated, however, that as the breech block is returned to its initial position, the same will force the ejector pawl outwardly into the slot 91 so that the same will form no obstruction at any time, other than the desired time for which the same is provided.

In describing the operation of the device, it will be assumed that the weapon is loaded, the breech block closed and the device entirely ready for firing whereupon it will be understood that as the trigger 40 is withdrawn, the trigger dog 41 will be caused to swing the sear 45 on its pivot against the tension of the spring pin 48 to release the hammer 50. This hammer 50, under tension of the spring forced pin 53, will be caused to rise into the cavity 25 of the breech block and to strike the firing pin 24 with considerable force, thereby causing the explosion of the shell within the gun. The position of the various parts of the device at this point, may be seen from Fig. 3 which is a section through the device showing the hammer in the position of striking the firing pin. Upon the discharge of the shell, the barrel with the breech block and other adjunctive parts will be recoiled and upon said rearward movement the hammer 50 will be forced downwardly to position to be again engaged by the sear 45. After the force of the recoil has been spent, the retractor spring 14 will have a tendency to withdraw the barrel and its parts to their initial positions but upon a slight return movement, the notch 89 in the breech block will be engaged with the extreme end of the hammer 50 which projects into the space covered by the barrel, thereby retaining the breech block, said position of the barrel, breech block and other parts being particularly shown in Fig. 7. The detention of the breech block by the hammer 50, which at this time becomes a pawl, will have no effect whatsoever upon the barrel 11 which will be swiftly retracted by means of the spring 14 and this detention of the breech block will be for such length of time as will permit the ejecting pawl 92 to engage the exploded shell and entirely eject the same from the device. The cam 52 which is provided on the rear end of the barrel 11 will contact with the housing 47 on the lever 43 immediately after the shell has been ejected from the device so as to force the lever 43 downwardly against the tension of the spring forced pin 51, which action will draw the hammer downwardly and allow the breech block 18 to be returned to its normal position under action of the spring 39. Thus it will be seen that said breech block will be obstructed or detained for just sufficient time to permit the exploded shell therein to be ejected from the fire arm, whereupon the same will be allowed to return to its initial position. The position of the various parts of the device at the time the pawl-like hammer 50 is being disengaged from the breech block may be readily seen from Fig. 6 which is a sectional view of the device showing these parts at that moment. As soon as the exploded shell has been ejected, the chamber or socket 16 will be in position to receive another shell from the magazine, as disclosed in Fig. 6. A new shell will be forced upwardly into the chamber 16 and the device is so arranged that at that moment the breech block will be released and returned to its initial position, thereby forcing the new shell into the chamber 17'. It must be here stated that at the time the explosion of the previous shell takes place. the breech block head 28 is locked within the chamber 16 and tightly against the spiral 23 but when the force of the recoil has been spent and the breech block has been engaged by the hammer, the drawing of the barrel to its initial position by the retractor spring will cause the head 28 to be revolved in the chamber 16, by the spiral connection thereof with the member 25. The recess 17 receives the lugs 30 of the head 28 as the latter is revolved and said head will be revolved in said chamber 16 until the lugs 30 thereon aline with the slots 31 in the chamber 16, whereupon the barrel may be readily withdrawn to its initial position, it being appreciated that said head 28 will have traveled a short distance on the spiral 23. The position of the head 28 with respect to the spiral 23 at this time may be clearly seen in Fig. 6. When the barrel 11 reaches a predetermined point in the forward travel or return movement thereof, the depending lug or projection 52 thereon contacts with the projection 47 on the lever 43, thereby forcing downwardly on said lever and releasing the hammer 50, which at that time forms a pawl, from its engagement with the shoulder on the breech block. This action, of course, permits the breech block to return to its normal closed position, under pressure of the retractor spring 39 and as the spiral 23 contacts with the head 28 with considerable force upon the return movement of the breech block, said head 28 will be caused to revolve on the spiral until the rear edge of the same contacts with the shoulder formed between the breech block proper and said spiral. The chamber 17 receives therein the lugs 30 on the head 28, thereby permitting said head to readily revolve without obstruction and when the revolution of the head 28 on the spiral of the breech block has been completed, the lugs 30 will be out of registration with the slots 31, thereby retaining said head and breech block in substantial locked position in the barrel. It is, of course, understood that upon the return movement of the barrel, a new shell is automatically received therein and the locking of the breech block in position will, of course, lock the new shell in the shell receiving chamber. The fire arm is then in condition to be again fired and if the gunner does not desire to have the same fired at once, and also does not wish to take the chance of the casual firing of the same, the safety catch may be thrown in position by moving the lever 59, forwardly, thereby preventing the movement of the trigger 40. The gunner may, at will, release the safety catch and discharge the gun, and it will be appreciated that as the magazine is relieved of the shell, the indicating mechanism thereof will at once disclose the number of shells remaining therein.

From the foregoing it will be seen that I have provided a simple, comparatively inexpensive and efficient means for carrying out the objects of my invention and while I have particularly described the elements best adapted to perform the functions set forth, it is obvious that various changes in form, proportion and in the minor details of construction may be resorted to without departing from the spirit or sacrificing any of the novel features of the invention.

Having thus described my invention what I claim is:

1. In a fire arm, the combination with a frame and a barrel casing carried thereby; of a longitudinally movable recoil operated barrel, a breech block slidably carried in said barrel, a sleeve disposed within the barrel casing and having connection with said breech block, a retractor spring coacting with said barrel and sleeve to normally retain the breech block in its closed position, and means carried on said barrel casing to withdraw the sleeve against the tension of said spring to open said breech block.

2. In a fire arm, the combination with a frame and a barrel casing carried thereby; of a longitudinally movable recoil operated barrel, a breech block slidably carried in said barrel, a sleeve disposed within said barrel casing and having a portion thereof in engagement with the breech block, a coil spring encircling said barrel, said coil spring coacting with portions of the barrel and said sleeve to normally retain said breech block in its closed position and a hand grip slidably carried on the barrel casing and cooperating with said sleeve to open said breech block independently of the movement of said barrel.

3. In a fire arm, the combination with a frame and a barrel casing carried thereby; said casing being provided with a pair of diametrically opposed longitudinal slots; of a longitudinally movable recoil operated barrel, a breech block slidably arranged within said barrel, a sleeve disposed within said barrel casing and having portions thereof in engagement with the breech block, spring means coacting with said barrel and sleeve to normally retain the breech block in its closed position and a hand grip slidably mounted on said barrel casing, slidable members operable by said grip and extending through the slots in said casing to coöperate with said sleeve, whereby said breech block may be opened independently of the movement of the barrel.

4. In a fire arm, the combination with a frame, and a barrel casing carried thereby, said casing being provided at a predetermined point thereon with a pair of longitudinal slots arranged at diametrically opposite points on the same; of a longitudinally movable recoil operated barrel, a breech block slidably arranged within said barrel, a sleeve disposed within said barrel casing and having portions thereof in engagement with the breech block, spring means engaged with the barrel and said sleeve to normally retain the breech block in its closed position, a hand grip slidably mounted on said barrel casing and having channels formed at diametrically opposite points therein, said channels being adapted to aline with the slots of said barrel casing, and a pair of plates slidably mounted in the channels of said grip and provided with inwardly extending lugs disposed through the slots of said casing, said inwardly extending lugs being adapted to engage portions of said sleeve to withdraw the same and correspondingly open the breech block upon the movement of said grip in one direction.

5. In a fire arm, the combination with a frame and a barrel casing carried thereby; of a longitudinally movable recoil operated barrel, a movable breech block carried by the barrel and movable independently thereof, spring means to normally retain the breech block in its closed position, a hammer, said hammer being adapted to form a pawl to temporarily lock the breech block in its rearward position, and means carried by the barrel adapted to release the engagement of the hammer with the breech block at a predetermined point in the forward travel of said barrel.

6. In a fire arm, the combination with a frame and a barrel casing carried thereby; of a longitudinally movable recoil operated barrel, a movable breech block carried in the rear end of the barrel, means to normally retain said breech block in its closed position, a hammer pivotally carried on the frame, means to force said hammer to its firing position, a locking means to retain the hammer in partially cocked position, said hammer in partially cocked position being adapted to form a locking pawl for the breech block when the barrel is in its retracted position, and means to dispose said hammer to full cocked position at a predetermined point in the forward travel of said barrel.

7. In a fire arm, the combination with a frame and a barrel casing carried thereby, a longitudinally movable recoil operated barrel, a movable breech block carried in the rear end of said barrel, means to normally retain said breech block in its closed position, a hammer pivotally carried on the frame, means to force said hammer to its firing position, a locking means adapted to engage and retain said hammer out of effective firing position upon the recoil of the barrel and breech block, said hammer being adapted to engage the breech block and temporarily retain the same in its rearward position, and means carried by the barrel adapted to release the engagement of the hammer with the breech block at a predetermined point in the forward travel of said barrel.

8. In a fire arm, the combination with a frame, and a barrel casing carried thereby; of a longitudinally movable recoil operated barrel, a movable breech block carried by the barrel and movable independently thereof, spring means to normally retain said breech block in its closed position, a hammer pivotally carried on the frame, means to force said hammer to its effective firing position, a lever pivotally carried on said frame and having means thereon adapted for engagement with said hammer to retain the latter in its ineffective position, said hammer in its ineffective position being also adapted to engage portions of said breech block to temporarily lock the same in its rearward position, and means on said barrel adapted to engage portions of said lever at a predetermined point in the forward travel of the barrel to unlock said hammer from its engagement with the breech block.

9. In a fire arm, the combination with a frame, a barrel casing carried thereby; of a longitudinally movable recoil operated barrel, a movable breech block carried by the barrel and movable independently thereof, spring means to normally retain said breech block in its closed position, a hammer pivotally carried on the frame, means to force said hammer to its effective firing position, a lever pivotally carried on the frame provided with a projection on the upper face thereof, means to yieldingly force said lever in its upward position, means carried on the free end of said lever to yieldingly engage said hammer and retain the same in its ineffective position, said hammer in the latter position being adapted to engage portions of said breech block to temporarily lock the latter in its rearward position, and a cam formed on the rear end of said barrel adapted to engage the projection on said lever at a predetermined point in the forward travel of said barrel, whereby said lever and hammer will be forced downwardly to unlock said breech block.

In testimony whereof I hereunto affix my signature in the presence of two witnesses.

NORMAN B. RANDALL.

Witnesses:
WILLIAM C. TAYLOR,
H. M. TAYLOR.